(12) United States Patent
Hendel

(10) Patent No.: US 8,707,305 B2
(45) Date of Patent: *Apr. 22, 2014

(54) FAILURE MANAGEMENT FOR A VIRTUALIZED COMPUTING ENVIRONMENT

(71) Applicant: Microsoft Corporation, Redmond, WA (US)

(72) Inventor: Matthew Douglas Hendel, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/762,998

(22) Filed: Feb. 8, 2013

(65) Prior Publication Data

US 2013/0152087 A1 Jun. 13, 2013

Related U.S. Application Data

(63) Continuation of application No. 11/171,141, filed on Jun. 29, 2005, now Pat. No. 8,375,386.

(51) Int. Cl.
*G06F 9/455* (2006.01)
*G06F 11/00* (2006.01)
*G06F 9/50* (2006.01)
*G06F 11/07* (2006.01)

(52) U.S. Cl.
CPC .......... *G06F 9/5077* (2013.01); *G06F 11/0778* (2013.01)
USPC .......................................... 718/1; 714/38.11

(58) Field of Classification Search
CPC .......................... G06F 9/5077; G06F 11/0778
USPC .......................................... 718/1; 714/38.11
See application file for complete search history.

(56) References Cited

U.S. PATENT DOCUMENTS

| 5,437,033 | A | 7/1995 | Inoue et al. |
| 6,643,802 | B1 | 11/2003 | Frost et al. |
| 6,854,115 | B1 | 2/2005 | Traversat et al. |
| 6,892,383 | B1 | 5/2005 | Arndt |
| 7,278,057 | B2 | 10/2007 | Betancourt et al. |
| 7,302,559 | B2 | 11/2007 | Oguma |
| 7,574,627 | B2 | 8/2009 | Ogasawara et al. |
| 8,375,386 | B2 | 2/2013 | Hendel |
| 8,453,015 | B2 * | 5/2013 | Ponnuswamy ............ 714/38.11 |

(Continued)

FOREIGN PATENT DOCUMENTS

JP 2005122334 A 5/2005

*Primary Examiner* — Emerson Puente
*Assistant Examiner* — Willy W Huaracha
(74) *Attorney, Agent, or Firm* — John Jardine; Andrew Sanders; Micky Minhas

(57) ABSTRACT

For failure management for multiple operating systems in a virtual environment, an external virtual machine or agent is provided that has been granted rights to full physical memory space to perform a crashdump for the machine. To avoid exposing secret information during a crashdump, private information for a virtual machine or partition is encrypted prior to generating a dump. The storing of crashdump information for virtual machines may avoid storing crashdump information for virtual machines that are stateless. Instead of having an (unstable) operating system running within a virtual machine perform a crashdump, the provision of an external agent, e.g., an external virtual machine, to perform the crashdump avoids many limitations associated with a normal dump when performed by a crashed operating system.

20 Claims, 11 Drawing Sheets

(56) References Cited

U.S. PATENT DOCUMENTS

| | | |
|---|---|---|
| 2003/0115442 A1 | 6/2003 | Whitney |
| 2004/0091114 A1 | 5/2004 | Carter et al. |
| 2005/0210077 A1 | 9/2005 | Balakrishnan et al. |
| 2006/0143534 A1 | 6/2006 | Dall |
| 2006/0225044 A1* | 10/2006 | Lewis ........................... 717/127 |
| 2007/0220350 A1 | 9/2007 | Ogasawara et al. |
| 2008/0126780 A1 | 5/2008 | Rajkumari et al. |
| 2008/0126879 A1 | 5/2008 | Tiwari et al. |
| 2009/0063651 A1 | 3/2009 | Brahmavar |
| 2009/0172409 A1* | 7/2009 | Bullis et al. .................... 713/189 |
| 2009/0254999 A1* | 10/2009 | Julin et al. ...................... 726/28 |
| 2011/0225459 A1* | 9/2011 | Fahrig et al. .................... 714/37 |
| 2011/0231710 A1 | 9/2011 | Laor |
| 2013/0145218 A1* | 6/2013 | Laor ........................... 714/38.11 |

\* cited by examiner under the volume manager layer into a single volume.
FAILURE MANAGEMENT FOR A VIRTUALIZED COMPUTING ENVIRONMENT

CROSS REFERENCE TO RELATED APPLICATIONS

This application is a continuation of U.S. patent application Ser. No. 11/171,141, filed Jun. 29, 2005, now U.S. Pat. No. 8,375,386, issued on Feb. 12, 2013, the contents of which is incorporated by reference herein in its entirety.

BACKGROUND

Capturing the cause(s) of system failures, i.e., crashes, is an important feature in modern operating systems. In the Windows family of operating systems, e.g., Windows NT, Windows 2000, Windows XP, crashdump is implemented via a complex interaction between the Windows kernel (ntoskrnl) and some lower level storage drivers. Some background relating to Windows storage, with emphasis on how crashdump interacts with the storage stack, is shown in FIGS. 1A and 1B. FIG. 1A shows a diagram of the Windows storage stack during normal operation, and FIG. 1B shows exemplary aspects of bypassing the Windows storage stack when system failure occurs.

Describing the actions of each layer in the stack of FIG. 1A, NTOSKRNL 200, a.k.a. the kernel, is responsible for determining whether an I/O request needs to be generated for this request, generating the request (IRP), and marshaling buffers, if necessary. The file-system 205 imposes file structure on the raw disk. The volume shadow copy 210 provides for lazy volume snapshots, which are used for live backup and rollback of files. The volume manager 215 presents user-level volumes, e.g., "C:", "D:" etc. This is the bottom of the volume stack. The volume manager 215 may also provide redundancy or striping capabilities. Therefore multiple disks may be aggregated by the volume layer into a single volume.

The partition manager 220 is the top of the device stack. The partition manager 220 has a private interface to volume manager 215, notifying the volume manager 215 when partitions come and go. The partition manager layer allows multiple disk-partitions to be exposed from a single disk drive. The term "disk-partition" is being used here in a nonstandard way to avoid confusion between partitions of a disk drive and partitions within a hypervisor.

With respect to disk 225, the disk class driver 225 translates IRP-based commands into SCSI commands, for instance, using the SCSI_REQUEST_BLOCK data structure. Disk 225 also manages any disk-specific aspects of the storage request. The port layer 230 manages a specific controller or adapter 240, which in turn interfaces with hard disk 245. For example, ScsiPort manages a SCSI controller (adapter), ATAPORT manages an IDE controller and SBP2PORT manages a 1394 controller. The port layer 230 also translates commands from a SCSI command set to non-SCSI command for devices that do no support the SCSI command set (such as IDE).

Miniport 235 is a vendor supplied layer that works in conjunction with a port driver 230 to access the controller hardware. Many types of storage controllers do not have standardized hardware interfaces, and therefore require vendor-supplied miniports 235 to program the hardware. Controllers that do have standardized hardware interfaces do not generally require miniports 235.

Ordinarily, during the writing of a crashdump, Windows bypasses most of these components and writes data directly to the port driver 230. This allows the operating system to successfully generate a crashdump in the presence of failures in the higher layers of the stack (such as the file-system 205). The crash dump stack is shown in FIG. 1B, illustrating exemplary operation of the Windows dump stack during a crashdump.

During a crashdump, the kernel NTOSKRNL 200 acts as the top seven layers in the storage stack, bypassing the file-system 205, volume shadow copy 210, volume manager 215, partition manager 220 and disk class layers 225. The kernel 200 communicates directly with a special purpose dump port driver 250 using a custom interface. The kernel 200 uses a private, synchronous interface to communicate with the port driver 250. The dump port driver 250 implements this interface, and it also implements the miniport interface, if necessary.

The miniport 235, if present, fulfills the same role in the dump stack as in the regular storage stack. Specifically, the miniport 235 provides a mechanism to submit commands to the storage adapter 240. In the ScsiPort and StorPort architectures, the miniport 235 may distinguish between the normal and dump operations for scanning for the "dump=1" string in the parameters passed into the HwFindAdapter routine of miniport 235.

The Windows dump stack as shown in FIG. 1B has a number of notable implications. Since the file-system 205 is not present during the crash, the kernel 200 needs to maintain enough file-system information to write to the dump file even without the file-system present. This is generally done by calculating the raw sector offsets on the disk and writing directly to the disk using the file-system control FSCTL_QUERY_RETRIEVAL_POINTERS. The file system 205 also may not modify the dump file in any manner after the file has been prepared to accept a crashdump. A file is said to be "locked" in the sense that the sectors comprising the file may not be moved, e.g., for defragmentation.

The volume management layer 215 is responsible for providing software-base redundancy and virtualization. For example, Microsoft's software RAID and striping implementations are implemented in the volume manager layer 215. Because the dump stack bypasses the volume management layer 215, the dump takes place to a volume that has redundancy or striping implemented atop of it.

The partition manager 220 and disk layers 225 manage the partition table for the device. The partition table specifies where a partition begins on a disk and the partition's size. The partition table on the volume that the dump is intended for therefore may not be modified.

Since a system crash may occur at any time, a crash may occur when locks are held or when at a raised IRQL. Therefore, the dump port driver 250 may not acquire locks, allocate memory, wait for resources, access paged data, etc. This limited environment is the reason that the mainline port driver 230 is not used to perform the crashdump. The mainline port driver 230 generally manages locks and other resources which are not feasible tasks to perform at crash time.

The miniport 235 (if present) has the same requirements as the port driver 230. Luckily, some miniport designs 235 do not expose such high-level primitives as locks and IRQL to miniport authors, so these issues are easily virtualized.

By way of further background, Windows supports three types of crashdumps: a full memory dump, a kernel memory dump and a minidump. A full memory dump dumps the entire physical memory of the machine. The kernel memory dump dumps only that portion of the address space devoted to kernel-memory. The minidump is a very small dump (generally 64 KB in size) that captures the minimal information necessary to triage and perform minimal debugging of the failure.

In a typical virtual machine environment, multiple virtual machines or "partitions" run on top of virtualizing software. This software, in turn, runs on top of hardware. The virtualizing software exposes the hardware in such a fashion that allows for a plurality of partitions, each with its own operating system (OS), to run on the hardware. The hardware is thus virtualized for the partitions by the virtualizing software.

Individual partitions are able to run disparate OSes, such as Windows, Linux, Solaris, MacOS and so on. These OSes can be isolated from each other such that if one OS in a partition crashes it will not affect other OSes in other partitions. Additionally, allowing multiple OSes to run on a single piece of hardware but in different partitions makes it easy to run different versions of software developed for different versions or types of OSes.

With respect to a crashdump architecture in a virtual environment, in a hypervisor/VMM environment, for instance, there are several additional problems and situations presented by crashdump.

The terms hypervisor and virtual machine manager (VMM) are used herein interchangeably, whether utilized in conjunction with or part of a host operating system or not; and the terms virtual machine and partition are also used interchangeably, i.e., where the term partition is used, this should be considered the same as the term virtual machine.

Frequently in a hypervisor or VMM environment, the hypervisor component will not have direct access to a physical storage device. In such an environment, it will not generally be possible for the hypervisor to generate a crashdump file because it does not have access to a storage device. Thus, a first problem for failure management in a virtual environment is that the hypervisor does not have access to storage to write a crashdump file.

In a secure environment, the principle goal is to ensure that secrets are never exposed. Assuming solution of the first problem above, and are able to generate a crashdump for a machine, it may be that secret data that was private to a virtual machine is exposed through the crashdump. Thus, a second problem for failure management in a virtual environment is that secrets may be exposed via a crashdump.

When generating crashdumps, a goal is to minimize the amount of data that is saved to the dump. Minimizing the amount of dump data serves two purposes. First, it reduces the size of the dump, and associated storage space that the dump consumes. Additionally, when the size of the crashdump is reduced, the speed to generate the crashdump is increased. Thus, a third problem for failure management in a virtual environment is that it is desired to reduce the amount of storage for a dump, and reduce the time to generate a dump.

The current Windows crashdump architecture has several other limitations as well. For instance, a crashdump may be generated only to the boot drive, badly corrupted machines will not generate crashdumps, and the crashdump code requires specific storage drivers to correctly operate. Thus, a fourth problem for failure management in a virtual environment is the avoidance of limitations in the current crashdump architecture. How these and other problems are addressed by the invention is described in the various following sections.

SUMMARY

For failure management for multiple operating systems in a virtual environment, an external virtual machine or agent is provided that has been granted rights to full physical memory space to perform a crashdump for the machine. To avoid exposing secret information during a crashdump, private information for a virtual machine or partition is encrypted prior to generating a dump. In various non-limiting embodiments, the storing of crashdump information for virtual machines avoids storing crashdump information for virtual machines that are stateless. Also, instead of having an (unstable) operating system running within a virtual machine perform a crashdump, the provision of an external agent, e.g., an external virtual machine, to perform the crashdump avoids many limitations associated with a normal dump when performed by a crashed operating system.

Other features of the present invention are described below.

BRIEF DESCRIPTION OF THE DRAWINGS

The techniques for failure management in a virtual environment are further described with reference to the accompanying drawings in which.

DETAILED DESCRIPTION OF ILLUSTRATIVE EMBODIMENTS

Overview

Figure 1A:
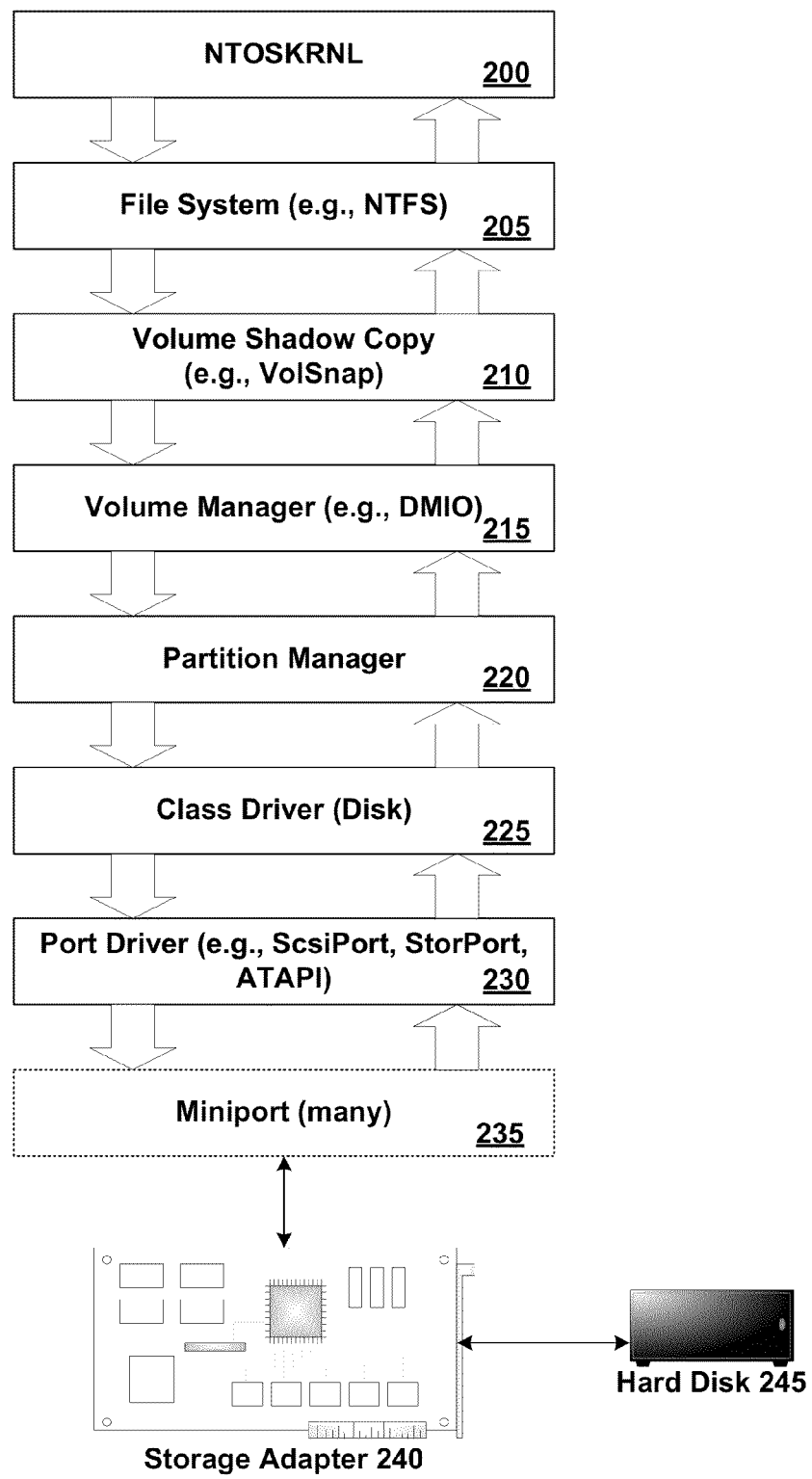
FIG. 1A is a block diagram illustrating a sequence of ordinary operation for the Windows storage stack.
Figure 1B:
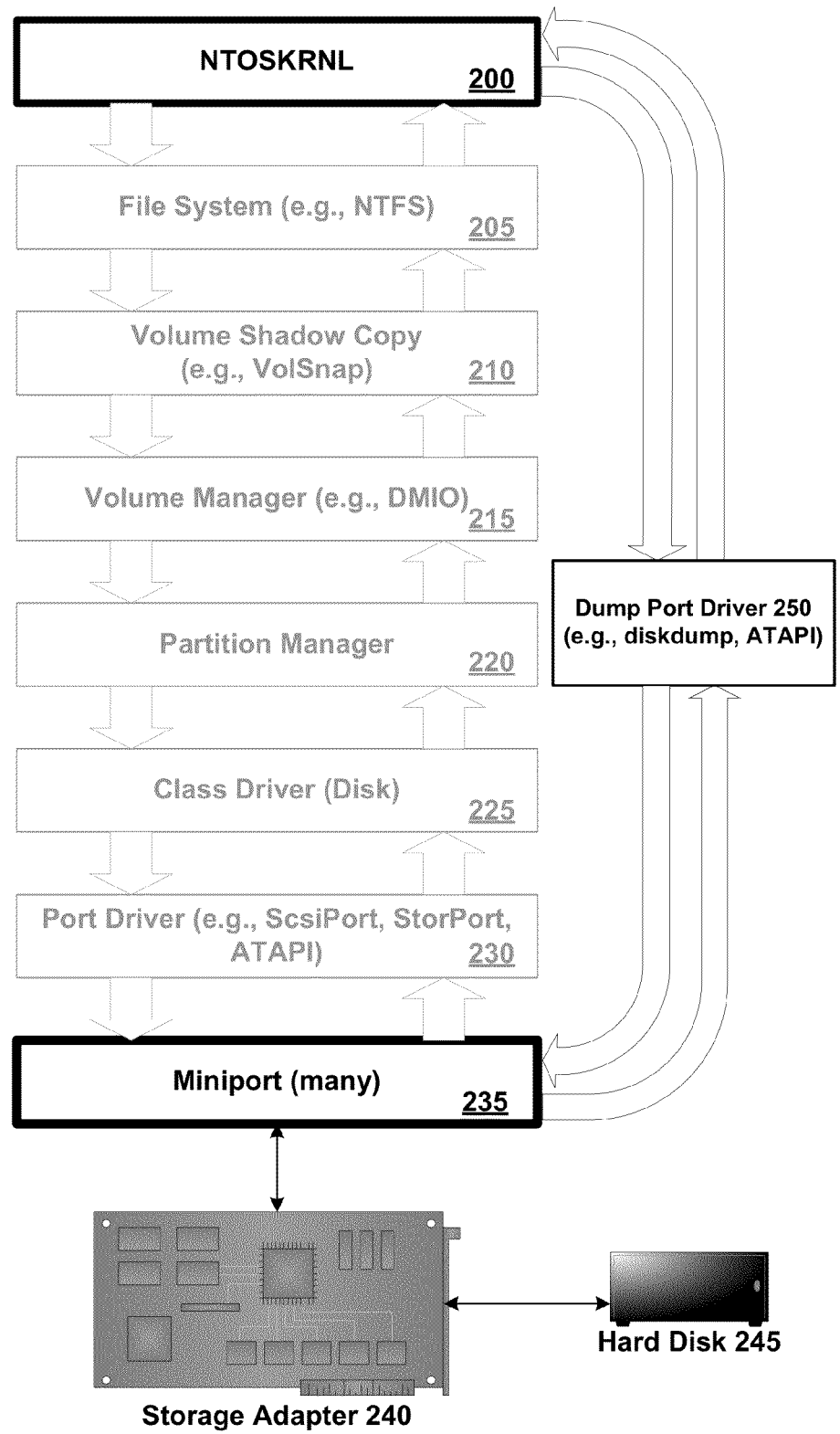
FIG. 1B is a block diagram illustrating an exemplary of sequence for operation of the Windows storage stack during crashdump.

As described in the background, robust failure handling has proven to be a significant feature in the Windows family of operating systems. Recently, features such as Watson, OCA and the minidump, have created a feedback loop where developers can quickly be informed of failures in shipping software, debug the failure and provide an update for the failure. The invention explores the performance of failure management and crashdump procedures for an operating system running in conjunction with a virtual environment having a virtual machine monitor, such as a hypervisor.

In one exemplary aspect, the invention provides dumping via an external virtual machine. In a crash of a traditional operating system, it is necessary for the operating system itself write the crash data for the machine. In a hypervisor/VMM environment, though, the hypervisor or VMM will not necessarily have access to the storage devices necessary to generate a crashdump. Accordingly, the invention provides an external virtual machine that has been granted rights to the full physical memory space to perform a crashdump for the machine.

In another exemplary aspect, the invention encrypts virtual machine private information. In a secure environment, i.e., an environment where the hypervisor or VMM is used to maintain security boundaries between separate virtual machines, and where virtual machines maintain secrets within their memory, generating a crashdump of the plain text memory within a virtual machine could lead to exposing secret information. To avoid this, the invention encrypts all private information for a virtual machine or partition prior to generating a dump.

In other exemplary aspects, the invention avoids dumping stateless partitions in a hypervisor or VMM environment. Writing crashdump information to disk takes time, and storing crashdump information in a storage device occupies space on that device. Therefore, the algorithm of the invention avoids storing crashdump information for virtual machines that are stateless—that is—any virtual machines whose state is irrelevant to the dump, and which can be easily be regenerated, are not saved as a part of the dump file.

By dumping a virtual machine via an external monitor, current dump limitations are avoided by the invention. Because a crashing operating system is always less stable, and generally less flexible than a correctly operating OS, certain limitations exist when generating a crashdump. Several of those limitations are outlined in the background section above. If instead of having the (unstable) operating system running within a virtual machine perform a crashdump, an external agent (an external virtual machine) is provided to perform the crashdump, several things are achieved.

First, the limitations associated with a normal dump are avoided. The crashdump file may be located on any device or volume, including networked volumes and the dump may occur even in the face of a badly corrupted operating system. Second the performance may be improved by utilizing a correctly operating storage driver instead of a dump driver. Finally, the stability of the external agent—which is running the well tested mainline storage driver—will generally be greater than the stability of the dump driver. Accordingly, use of an external virtual machine to generate a crashdump in accordance with the invention achieves several advantages and improvements over the state of the art.

Virtual Machines

Figure 2:
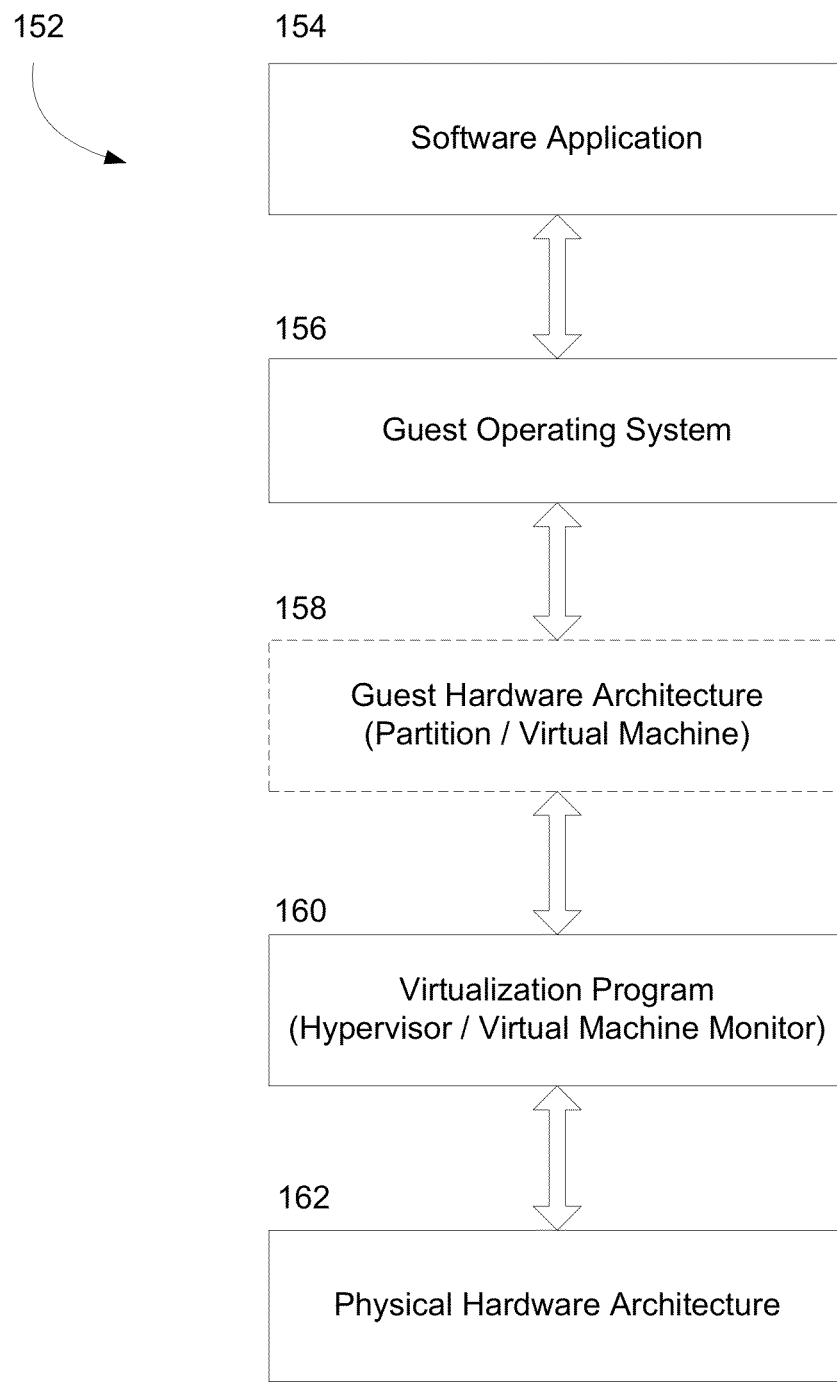
FIG. 2 is a block diagram representing the logical layering of the hardware and software architecture for virtualized operating environment in a computer system.

FIG. 2 is a diagram representing the logical layering of the hardware and software architecture for a virtualized environment in a computer system. In the figure, a virtualization program 160 runs directly or indirectly on the physical hardware architecture 162. The virtualization program 160 may be (a) a virtual machine monitor that runs alongside a host operating system or (b) a host operating system with a hypervisor component wherein the hypervisor component performs the virtualization. The virtualization program 160 virtualizes a guest hardware architecture 158 (shown as dashed lines to illustrate the fact that this component is a partition or a "virtual machine"), that is, hardware that does not actually exist but is instead virtualized by the virtualizing program 160. A guest operating system 156 executes on the guest hardware architecture 158, and a software application 154 runs on the guest operating system 156. In the virtualized operating environment of FIG. 2, the software application 154 can run in a computer system 152 even if the software application 154 is designed to run on an operating system that is generally incompatible with a host operating system and the hardware architecture 162.

Figure 3A:
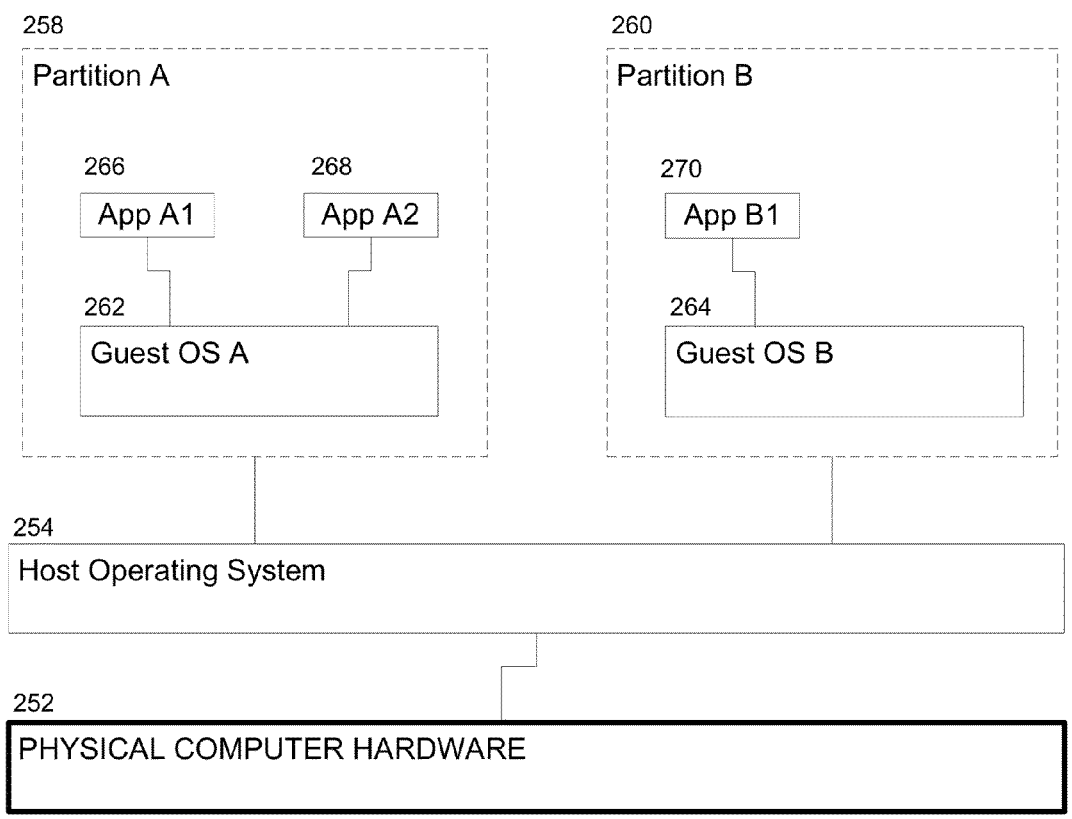
FIG. 3A is a block diagram representing a virtualized computing system wherein the virtualization is performed by the host operating system (either directly or via a hypervisor)

FIG. 3A illustrates a virtualized computing system comprising a host operating system (host OS) software layer 254 running directly above physical computer hardware 252, where the host OS 254 provides access to the resources of the physical computer hardware 252 by exposing interfaces to partitions A 258 and B 260 for the use by operating systems 262 and 264, respectively. This enables the host OS 254 to go unnoticed by operating system layers 262 and 264 running above it. Again, to perform the virtualization, the host OS 254 may be a specially designed operating system with native virtualization capabilities or, alternately, it may be a standard operating system with an incorporated hypervisor component for performing the virtualization (not shown).

Referring again to FIG. 3A, above the host OS 254 there are two partitions, partition A 258, which may be, for example, a virtualized Intel 386 processor, and partition B 260, which may be, for example, a virtualized version of one of the Motorola 680X0 family of processors. Within each partition 258 and 260 are guest operating systems (guest OSs) A 262 and B 264, respectively. Running on top of guest OS A 262 are two applications, application A1 266 and application A2 268, and running on top of guest OS B 264 is application B1 270.

In regard to FIG. 3A, it is important to note that partition A 258 and partition B 260 (which are shown in dashed lines) are virtualized computer hardware representations that exist only as software constructions. They are made possible due to the execution of specialized virtualization software(s) that not only presents partition A 258 and partition B 260 to Guest OS A 262 and Guest OS B 264, respectively, but which also performs all of the software steps necessary for Guest OS A 262 and Guest OS B 264 to indirectly interact with the real physical computer hardware 252.

Figure 3B:
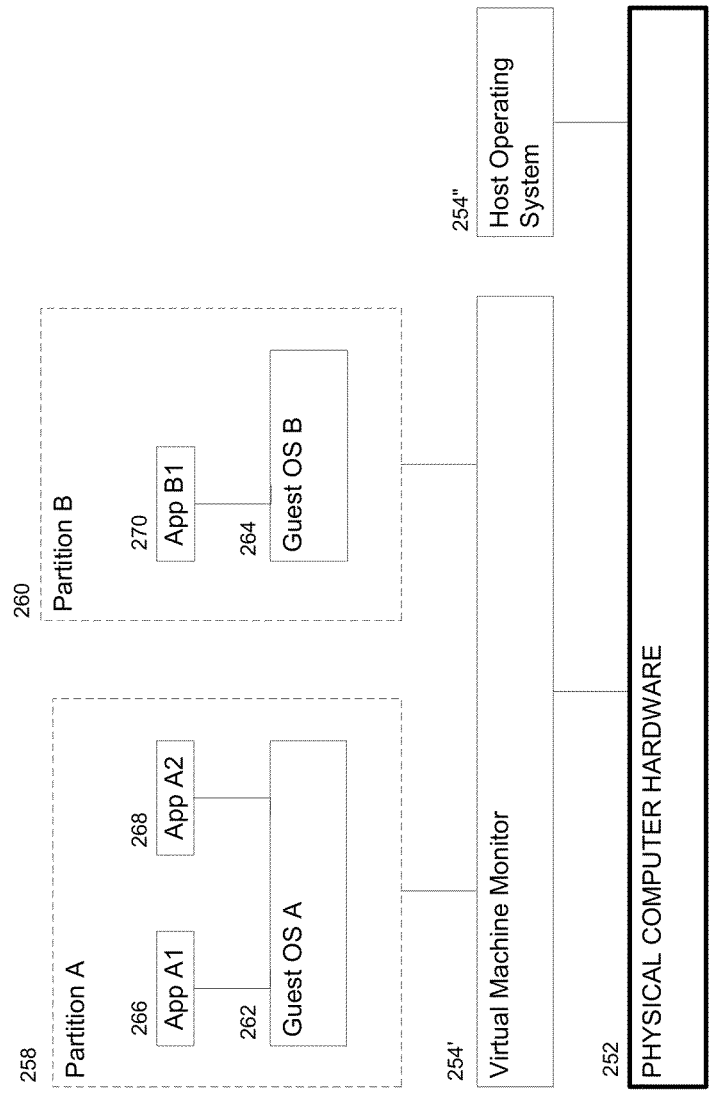
FIG. 3B is a block diagram representing an alternative virtualized computing system wherein the virtualization is performed by a virtual machine monitor running side-by-side with a host operating system.

FIG. 3B illustrates an alternative virtualized computing system wherein the virtualization is performed by a virtual machine monitor (VMM) 254' running alongside the host operating system 254". In certain cases, the VMM 254' may be an application running above the host operating system 254" and interacting with the computer hardware 252 only through the host operating system 254". In other cases, as shown in FIG. 3B, the VMM 254' may instead comprise a partially independent software system that on some levels interacts indirectly with the computer hardware 252 via the host operating system 254" but on other levels the VMM 254' interacts directly with the computer hardware 252 (similar to the way the host operating system interacts directly with the computer hardware). And yet in other cases, the VMM 254' may comprise a fully independent software system that on all levels interacts directly with the computer hardware 252 (similar to the way the host operating system interacts directly with the computer hardware) without utilizing the host operating system 254" (although still interacting with the host operating system 254" in order to coordinate use of the computer hardware 252 and avoid conflicts and the like).

All of these variations for implementing the above mentioned partitions are just exemplary implementations, and nothing herein should be interpreted as limiting the invention to any particular virtualization aspect.

Failure Management in a Virtualized Environment

As mentioned, in various non-limiting embodiments of the invention, an external virtual machine is provided that has been granted rights to full physical memory space to perform a crashdump for the machine. To avoid exposing secret information during a crashdump, all private information for a virtual machine or partition is encrypted prior to generating a dump. The algorithm for storing crashdump information for virtual machines avoids writing data for virtual machines that are stateless. Instead of having an (unstable) operating system running within a virtual machine perform a crashdump, the provision of an external agent (an external virtual machine) to perform the crashdump avoids many limitations associated with a normal dump.

Figure 4A:
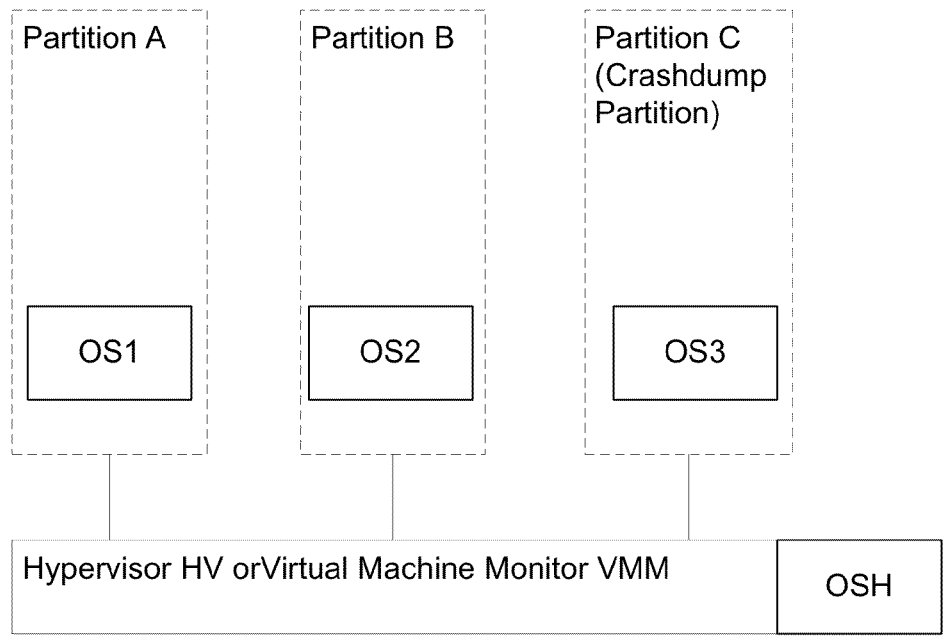
FIG. 4A is a block diagram representing a virtualized computing system wherein the virtualization is performed by a host operating system (either directly or via a hypervisor/virtual machine monitor)
Figure 4B:
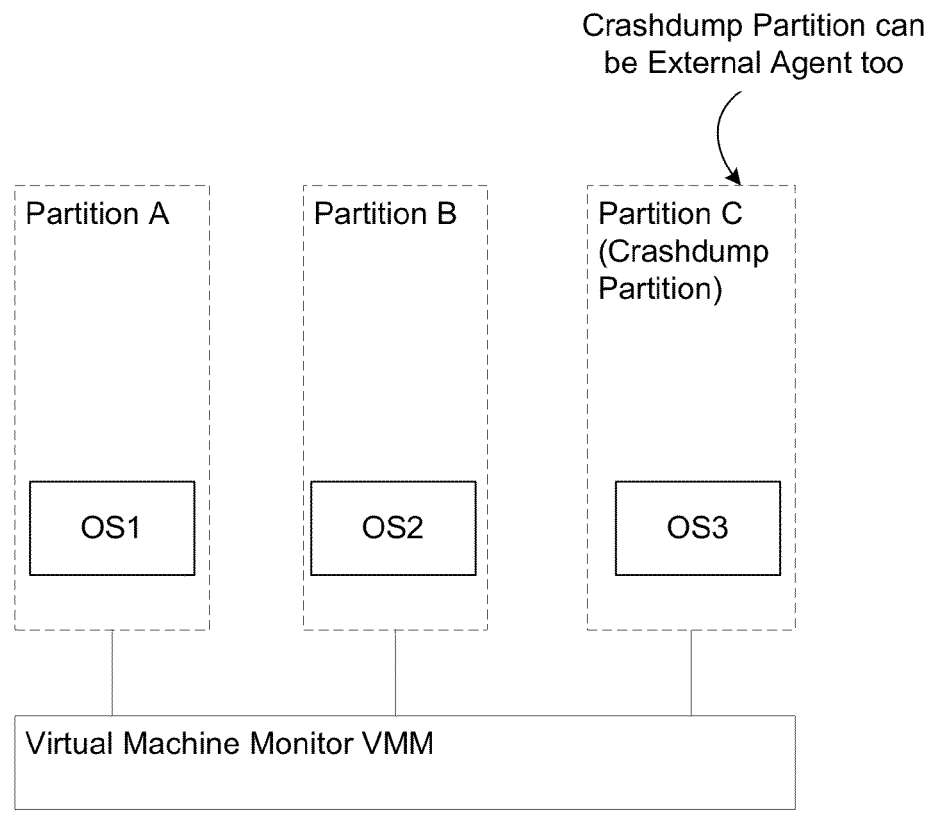
FIG. 4B is a block diagram representing an alternative virtualized computing system wherein the virtualization is performed by a virtual machine monitor.

In this regard, the invention uses a dump virtual machine or dump partition to write crashdump data to storage. Thus, as illustrated in FIG. 4A, there are three partitions A, B and C with guest OSs OS1, OS2 and OS3, respectively, executing via virtual machine monitor VMM and host OS OSH. In accordance with the invention, one of the partitions, e.g., partition C, is selected as the crashdump partition. In one non-limiting embodiment, a dump virtual machine in accordance with the invention is defined as a virtual machine with the following properties: (1) Non-virtualized access to dump storage hardware and (2) Ability to address (although not necessarily access) all virtual memory in the machine. As illustrated in FIG. 4B, the invention may designate a dump partition or external agent for performing crashdumps in a fully virtualized environment as well.

Figure 5A:
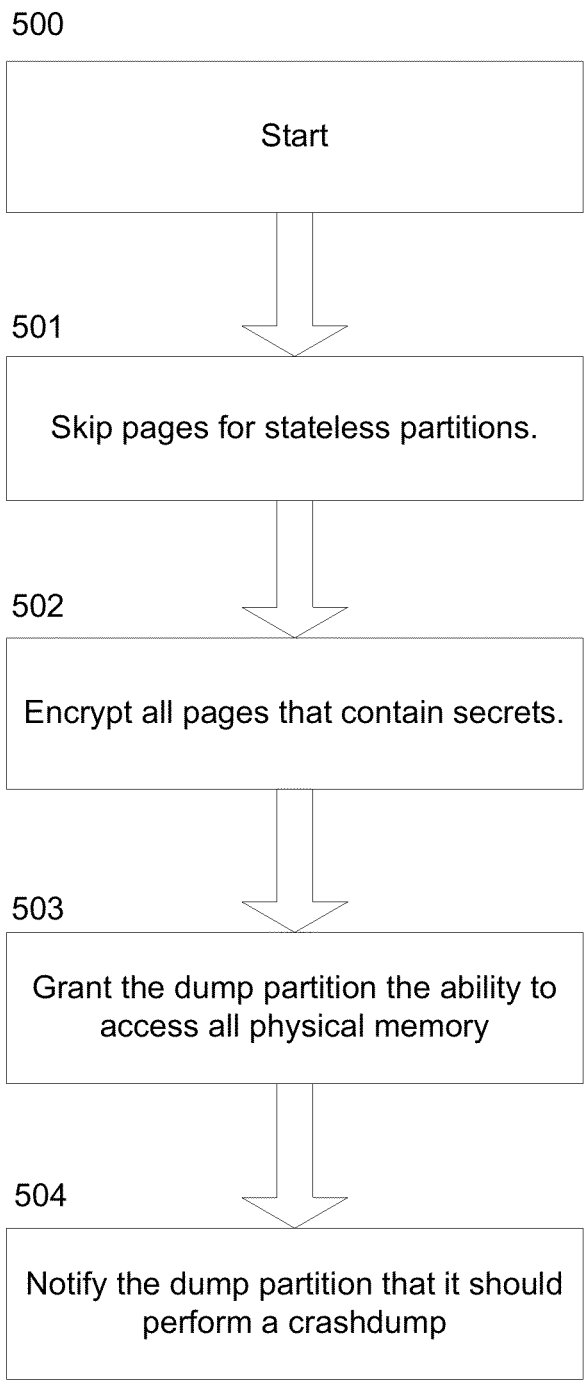
FIGS. 5A, 5B and 5C are exemplary non-limiting flow diagrams illustrating some exemplary steps for performing failure management via and external dump partition or agent in a virtualized environment.

In one non-limiting embodiment of the invention, the hypervisor implements crashdump using the following steps, though not necessarily in any particular order, serial or parallel, as shown in FIG. 5A wherein the following steps have the following actions:

Step 500: Start

Step 501: Avoid writing for (e.g., skip, or otherwise don't take into account) pages of stateless partitions.

Step 502: Encrypt all pages that contain secrets.

Step 503: Grant the dump partition the ability to access all physical memory.

Step 504: Notify the dump partition that it should perform a crashdump.

The methods described herein may save the entire physical address space for the machine in a single image, and addresses several of the problems with current crashdump architectures for a virtualized environment identified in the background section above.

Figure 5B:
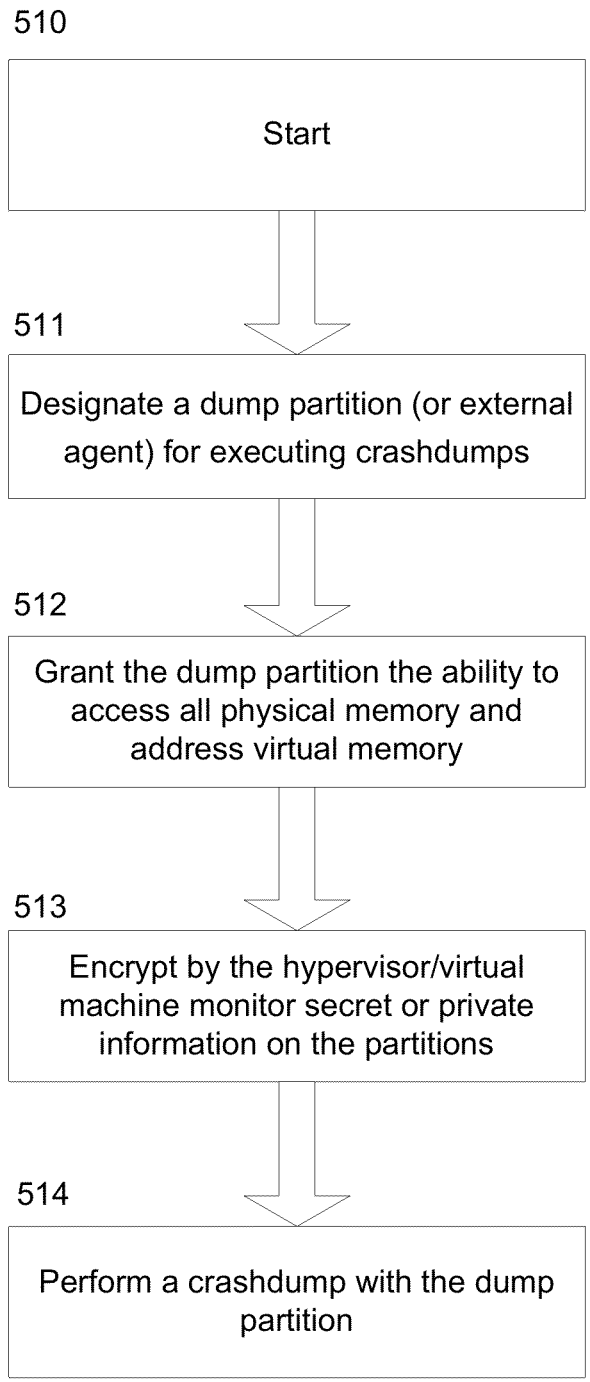

For instance, as illustrated in the flow diagram of FIG. 5B, the invention may operate after start 510 to designate at 511 one of the virtual machines as a dump virtual machine for executing crashdumps. Such virtual machine could be instantiated as the dump virtual machine or could be created as an external dump agent. At 512, the dump virtual machine is granted the ability to access all physical memory and address virtual memory. At 513, a hypervisor/virtual machine monitor encrypts any secret information stored on the virtual machines and at 514, the crashdump is performed by the dump virtual machine without exposing the encrypted secret information.

Figure 5C:
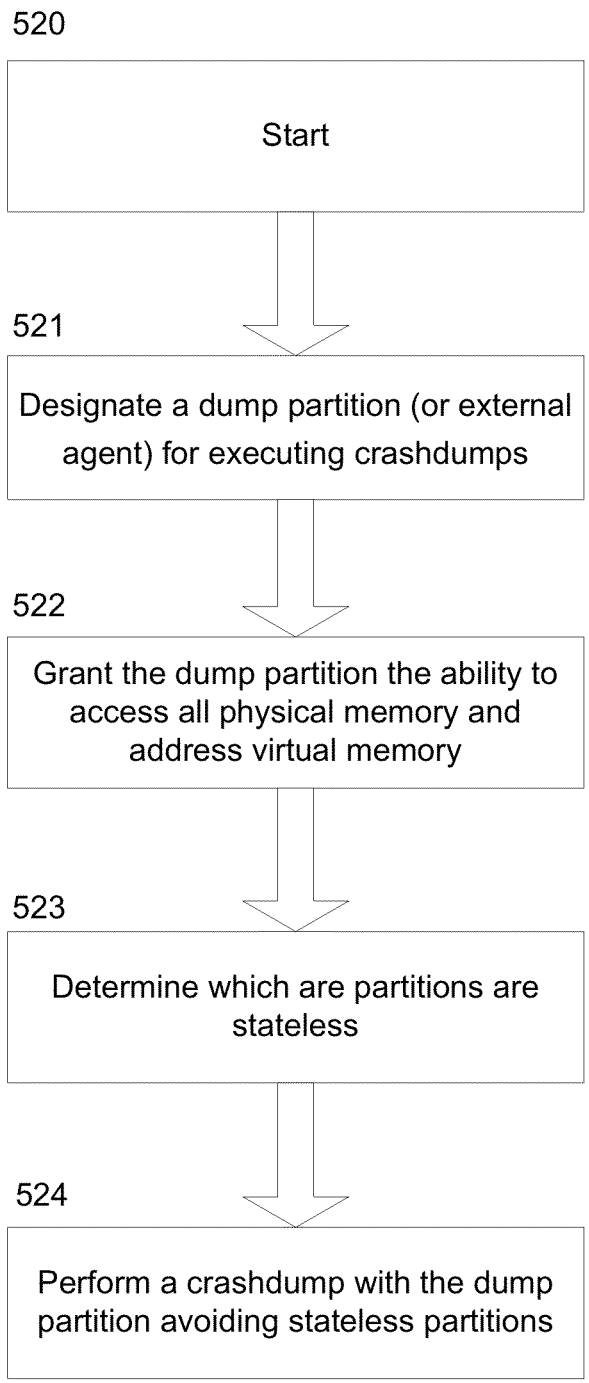

In another embodiment, as illustrated in the flow diagram of FIG. 5C, the invention may operate after start 520 to designate at 521 one of the virtual machines as a dump virtual machine for executing crashdumps. As mentioned, such virtual machine could be instantiated as the dump virtual machine or could be created as an external dump agent. At 522, the dump virtual machine is granted the ability to access all physical memory and address virtual memory. At 523, a hypervisor/virtual determines which partitions are stateless and at 524, the crashdump is performed by the dump virtual machine without dumping any stateless partitions.

In accordance with the invention, for a fully virtualized virtual machine, if the VM crashes, the virtual machine does not need to perform a dump itself using its storage driver. Rather, in accordance with the invention, a virtual machine may notify the hypervisor that a crashdump should occur and allow the hypervisor or an external agent, to generate the crashdump for the virtual machine. This has several advantages:

The dump may be to any stable storage device, including network drives, non-boot devices, etc. Standard crashdump is isolated to dumping to a pre-defined set of drives (boot devices).

The dump can continue even if the virtual machine is badly corrupted. In the current crashdump architecture, an operating system may be too badly corrupted to generate a crashdump.

The dump may use the production storage drives within the dump virtual machine to generate the dump. In a traditional crashdump, it is necessary to use a special dump driver to generate a crashdump. Production storage drivers, in contrast, are faster and more reliable than dump drivers.

With respect to crashdump and the hypervisor, to perform a crashdump, the external agent or component should have direct access to a storage controller. Additionally, because hardware interfaces are not publicly available for all types of storage adapters, whatever component performs a crashdump should support loadable device drivers and implement a device-driver model that 3rd party vendors can adopt.

Because of these issues, the hypervisor does not itself perform a crashdump; instead the hypervisor notifies the partition with direct access to the storage hardware to perform the dump. This partition is termed the dump partition herein. This partition may be selected initially to be, for instance, the Host Operating System (i.e., primary guest partition) of the hypervisor.

Three different crashdump scenarios may manifest when running in conjunction with the hypervisor; these scenarios are: the hypervisor crashes, the dump partition crashes, and a non-dump partition crashes, discussed as follows.

With respect to hypervisor crashes, in the first scenario, the hypervisor faults and wishes to dump its state somewhere. There are three issues. First, how does the hypervisor's state get transmitted to the dump partition? Second, what state should be saved on a hypervisor fault? Third, how does the dump partition get told to create a dump?

In this regard, the hypervisor uses shared memory to transport its state to the dump partition. There are two types of shared memory that the hypervisor may implement to share state between itself and the dump partition. The first is a shared dump region specifically allocated for the purpose of sharing debug data between the hypervisor and the dump partition in the case of a crash. This memory region is virtually accessible to both the hypervisor and the dump partition throughout the lifetime of the two components, and is registered with the dump partition prior to the crash, e.g., via KeRegisterBugcheckReasonCallback( ). Alternatively, the hypervisor may be able to map its memory into the virtual address space of the dump partition after a failure is detected. If the dump partition already knows about the physical memory in use by the hypervisor, then this is trivial.

The different approaches for sharing the hypervisor's state are intertwined with the question of what data is desired in the dump, e.g., deciding what data belongs in a secure dump versus an insecure dump. If only a minimal amount of information that has been scrubbed for secrets is wanted, then a pre-allocated region is sufficient. This is called a secure dump. In contrast, if the full context of the hypervisor is desired at the time of the crash, mapping the memory into the virtual-address space of the dump partition becomes attractive. This is called an insecure dump.

One result of having a custom dump block is corresponding additional tools to parse and understand the dump data. Such external tools are used to generate a debuggable dump of the hypervisor consisting only of the hypervisor that may be debugged by the kernel debugger in a manner similar to current dumps. Such a tool extracts the hypervisor pages from the dump, assembling them into a hypervisor only dump file.

Finally, the hypervisor signals to the dump partition that it should generate a dump. The hypervisor uses interrupts to communicate with partitions. If the hypervisor knows a priori that the dump partition is operational, the hypervisor would be able to generate a normal interrupt into the dump partition to generate a crashdump. Unfortunately, the hypervisor does not know if the dump partition is working or not. Therefore, a standard interrupt is not a good option. Thus, in one embodiment, a non-maskable interrupt is used to signal to the dump partition to crash itself.

With respect to the case of the dump partition crashing, if the dump partition manages the physical memory for the machine, then it has direct access to the physical memory in the machine. This is significant because the crashdump algorithms described herein assume complete access to physical memory.

If access to physical memory is not virtualized for the dump partition, then it is ensured that recursive crashing does not occur while trying to dump hypervisor pages.

Broadly speaking, there are two approaches to ensuring the dump partition does not attempt to access hypervisor pages while performing a dump. In this regard, either the dump partition can do the work or the hypervisor can do the work.

If the dump partition does the work, it communicates with the hypervisor to determine if a physical page is accessible or not. This communication path can be a hypervisor call, shared memory or some other known mechanism for communicating information among objects.

To have the hypervisor perform the work of ensuring the dump partition can access all physical memory, the hypervisor redirects an access to a restricted page to a non-restricted page. A different approach includes having the hypervisor unload altogether and return its memory pages to the primary partition after scrubbing any secrets.

In either case above, the dump partition may be crashing either due to its own failure or due to a hypervisor crash. Therefore, relying upon hypervisor functionality during a crash is risky. The cause of the crash could be corruption of internal hypervisor data structures, which could lead, in the worst case, to recursive crashes. In one embodiment, the dump partition has the following characteristics. (1) Non-virtualized access to dump storage hardware, (2) Access to all physical memory in the physical memory map (MmPhysicalMemoryBlock) or a way to determine if a page in the memory map is accessible or not, (3) Access to screen for displaying the dump-screen, e.g., Blue Screen of Death, (optional since a dump can still be generated without such access, though it would be less functional) and (4) Ability to reboot machine.

With respect to the case of when a non-dump partition crashes, the partition uses its virtual storage adapter to perform a crashdump. Since the non-dump partition has a virtual view of storage, physical memory and the screen, there are no issues with accessing these resources.

In accordance with an embodiment, the partition signals to the hypervisor to perform the crashdump, whereby the dump is performed externally to the crashing partition. This proposal has several attractive benefits.

To ensure the dump partition does not access hypervisor-restricted memory during a dump, mechanisms may be provided as follows: have a map of which pages are devoted to the hypervisor and have the dump partition not attempt to write these pages, have the dump partition ask the hypervisor if a specific page is valid, have the hypervisor trap on access to hypervisor pages and fixup the access with an access to a valid page and have the hypervisor unload itself and turn off all memory traps, scrubbing its memory.

In brief sum, in a non-virtualized system, the OS saves certain data to a physical storage device when it appears that a crash has occurred. This process is referred to as a crashdump. Handling crashdumps in a hypervisor, or virtual machine monitor virtualized system thus presents several problems, including the lack of direct access to a physical storage device by the hypervisor/virtual machine monitor, the volume of data that needs to be stored, and possible exposure of private data that the hypervisor/virtual machine monitor is designed to protect. The invention describes various mechanisms for implementing crashdumps effectively in a hypervisor/virtual machine monitor environment. In various non-limiting embodiments described in more detail above, a virtual machine or agent external to the hypervisor/virtual machine monitor is granted rights to the full physical address space of the system and includes code to implement crashdumps for the hypervisor/virtual machine monitor. For one embodiment, the external agent saves data from only selected virtual machines, and/or the external agent encrypts private or secret data prior to saving during the crashdump process.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with failure management in a virtualized environment in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate a failure for failure management in a virtualized environment in accordance with the invention.

Figure 6A:
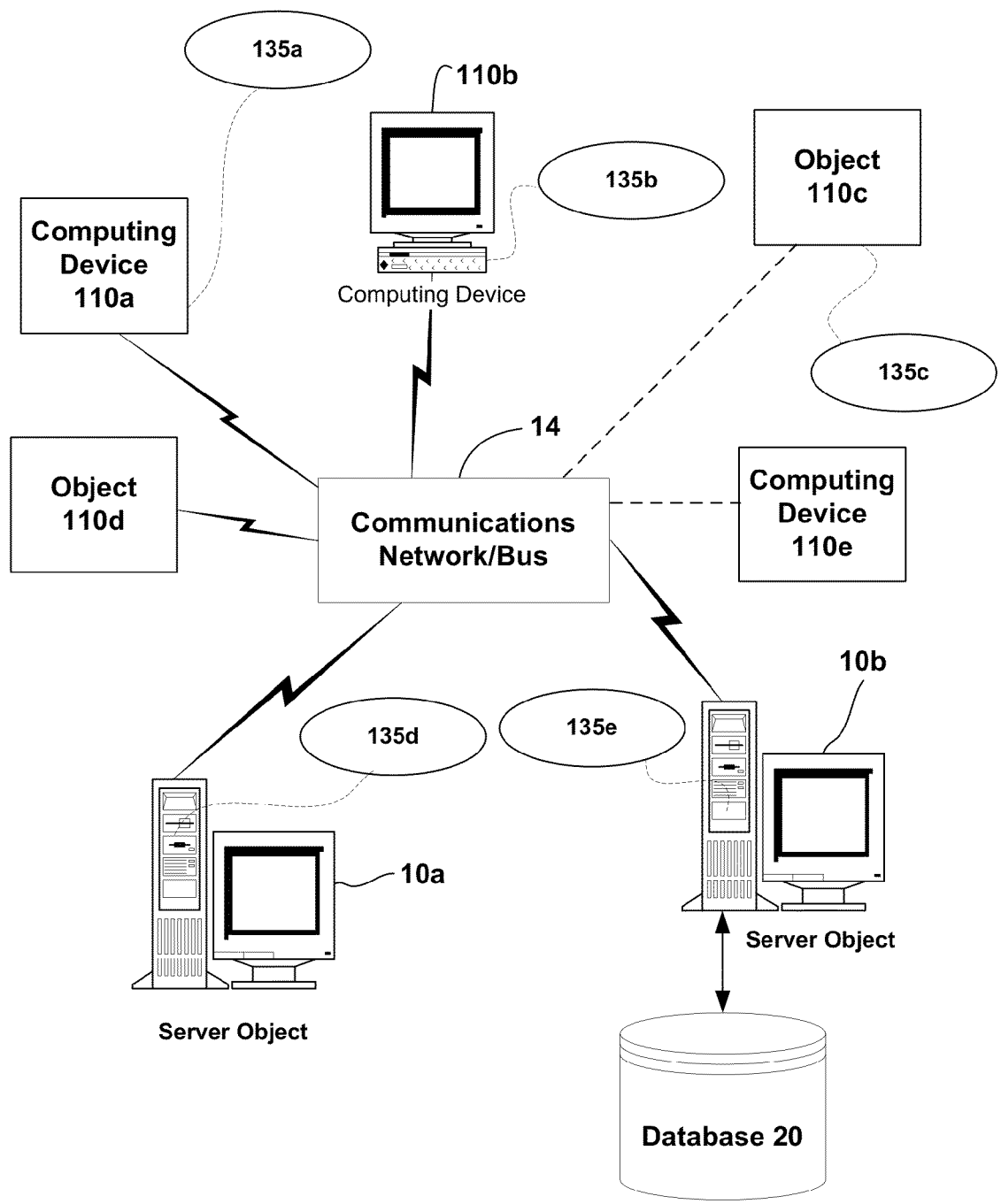
FIG. 6A is a block diagram representing an exemplary network environment in which the present invention may be implemented.

FIG. 6A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 6A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, that may implicate a failure for applying the failure management techniques in a virtualized environment in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to storage or failure management techniques in a virtualized environment in accordance with the invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, computing devices share data according to a variety of techniques, such as data accessed pursuant to a crashdump generated by the external dump agent, such as a dump virtual machine, in accordance with the invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 6A, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may implicate a failure requiring the failure management techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for failure management of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 6A illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to collect crashdump information following a failure.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 6B:
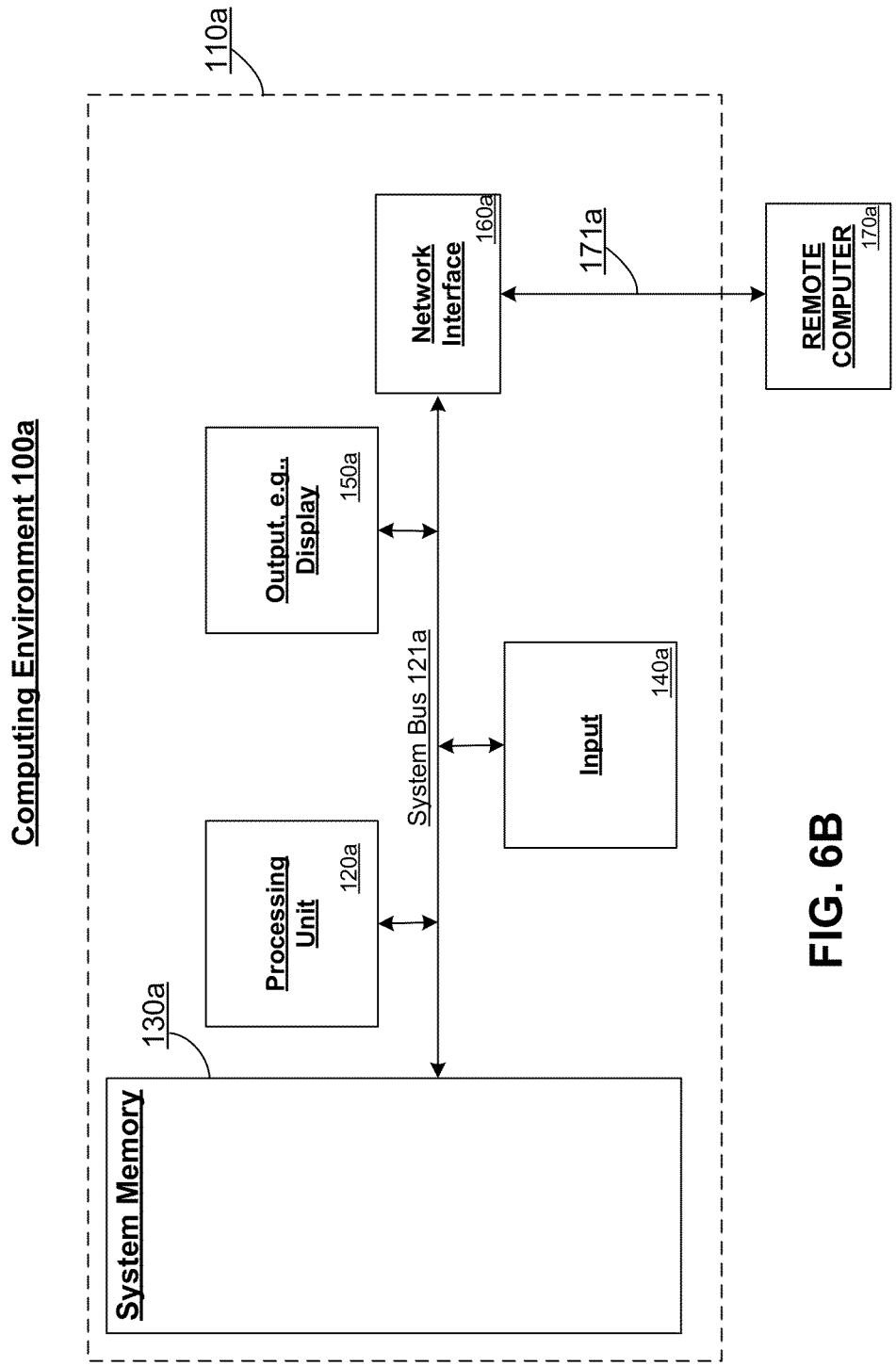
FIG. 6B is a block diagram representing an exemplary non-limiting computing system environment in which the present invention may be implemented.

As mentioned, the invention applies to any device wherein it may be desirable to perform failure management following the failure of one or more virtual machines in a virtualized environment. It should be understood, therefore, that handheld, portable and other computing devices and computing objects of all kinds are contemplated for use in connection with the present invention, i.e., anywhere that a device may execute in a virtualized environment with a hypervisor component or virtual machine monitor. Accordingly, the below general purpose remote computer described below in FIG. 6B is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 6B thus illustrates an example of a suitable computing system environment 100a in which the invention may be implemented, although as made clear above, the computing system environment 100a is only one example of a suitable computing environment for a media device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 6B, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

A user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120*a* through user input 140*a* and associated interface(s) that are coupled to the system bus 121*a*, but may be connected by other interface and bus structures, such as a parallel port, game port or a universal serial bus (USB). A graphics subsystem may also be connected to the system bus 121*a*. A monitor or other type of display device is also connected to the system bus 121*a* via an interface, such as output interface 150*a*, which may in turn communicate with video memory. In addition to a monitor, computers may also include other peripheral output devices such as speakers and a printer, which may be connected through output interface 150*a*.

The computer 110*a* may operate in a networked or distributed environment using logical connections to one or more other remote computers, such as remote computer 170*a*, which may in turn have media capabilities different from device 110*a*. The remote computer 170*a* may be a personal computer, a server, a router, a network PC, a peer device or other common network node, or any other remote media consumption or transmission device, and may include any or all of the elements described above relative to the computer 110*a*. The logical connections depicted in FIG. 6B include a network 171*a*, such local area network (LAN) or a wide area network (WAN), but may also include other networks/buses. Such networking environments are commonplace in homes, offices, enterprise-wide computer networks, intranets and the Internet.

When used in a LAN networking environment, the computer 110*a* is connected to the LAN 171*a* through a network interface or adapter. When used in a WAN networking environment, the computer 110*a* typically includes a modem or other means for establishing communications over the WAN, such as the Internet. A modem, which may be internal or external, may be connected to the system bus 121*a* via the user input interface of input 140*a*, or other appropriate mechanism. In a networked environment, program modules depicted relative to the computer 110*a*, or portions thereof, may be stored in a remote memory storage device. It will be appreciated that the network connections shown and described are exemplary and other means of establishing a communications link between the computers may be used.
Exemplary Distributed Computing Frameworks or Architectures Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein and associated communications are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for performing failure management in a virtualized environment in accordance with the invention may be included in, supported in or accessed via all of the languages and services enabled by managed code, such as .NET code, and in other distributed computing frameworks as well.

There are thus multiple ways of implementing the present invention, e.g., an appropriate API, tool kit, driver code, operating system, control, standalone or downloadable software object, etc. which enables applications and services to use the systems and methods for performing failure management in a virtualized environment of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to perform failure management in a virtualized environment. For instance, the a lgorithm(s) and hardware implementations of the invention may be applied to the operating system of a computing device, provided as a separate object on the device, as part of another object, as a downloadable object from a server, as a "middle man" between a device or object and a network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the failure management techniques in a virtualized environment of the present invention, e.g., through the use of a data processing API, or the like, are preferably implemented in a high level procedural or object oriented programming language to communicate with a computer system. However, the program(s) can be implemented in assembly or machine language, if desired. In any case, the language may be a partially or wholly compiled, or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network—anywhere where a virtualized computing environment may be found. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A computer-readable storage medium having stored thereon instructions that, upon execution by a computing device, cause the computing device to at least:
   designate an external agent for dumping state data pertaining to a hypervisor crash, the external agent comprising a virtual machine associated with the hypervisor and having non-virtualized access to a storage device;
   share a memory region between a hypervisor and the external agent;
   transport hypervisor state data to the shared memory region; and
   signal to the external agent that a crashdump should be generated based on the hypervisor state data.

2. The computer-readable medium of claim 1, wherein the external agent has direct access to a storage controller.

3. The computer-readable medium of claim 1, wherein the external agent is a virtual machine associated with the hypervisor.

4. The computer-readable medium of claim 1, having stored thereon instructions that, when executed by a computing device, cause the computing device to extract hypervisor pages from the state data pertaining to the hypervisor crash.

5. The computer-readable medium of claim 1, wherein transporting hypervisor state comprises one or more of excluding a page containing secure data and encrypting a page containing secure data.

6. The computer-readable medium of claim 1, having stored thereon instructions that, when executed by a computing device, cause the device to redirect access to a restricted page to an unrestricted page.

7. The computer-readable medium of claim 1, wherein sharing a memory region comprises mapping hypervisor memory into the virtual address space of the external agent.

8. The computer-readable medium of claim 1, having stored thereon instructions that, when executed by a computing device, cause the device to provide the external agent with non-virtualized access to physical memory.

9. A method for generating a crashdump pertaining to the state of a hypervisor that has crashed, the method comprising:
   designating one of a plurality of virtual machines as an external agent for generating the crashdump, the external agent having non-virtualized access to a storage device;
   sharing a memory region between the external agent and the hypervisor;
   transporting the state data to the shared memory region;
   generating the crashdump based on the state data transported to the shared memory region and storing the crashdump using the non-virtualized access to the storage device; and
   preventing the external agent from accessing hypervisor-restricted memory while generating the crashdump.

10. The method of claim 9, wherein sharing the memory region comprises allocating the memory region, making the memory region virtually accessible to the hypervisor and the external agent, and registering the memory region with the external agent.

11. The method of claim 9, wherein sharing the memory region comprises mapping memory of the hypervisor into the virtual address space of the external agent after a hypervisor crash has been detected.

12. The method of claim 9, further comprising redirecting a memory access request made by the external agent from a restricted page to an unrestricted page.

13. The method of claim 9, further comprising providing the external agent with non-virtualized access to physical memory.

14. The method of claim 9, further comprising extracting hypervisor pages from the crash data to produce a crashdump that excludes data not pertaining to the hypervisor crash.

15. A system for generating a crashdump pertaining to the state of a hypervisor that has faulted, the system comprising:
   a computing system configured to operate the hypervisor, the hypervisor running at least one virtual machine;
   one of the at least one virtual machines configured to operate as an external agent for generating a crashdump pertaining to the state of the hypervisor after the hypervisor has faulted,
   the external agent configured to have non-virtualized access to a storage device;

the hypervisor and external agent configured to share a memory region, the hypervisor configured to transport hypervisor state data to the shared memory region;

the hypervisor configured to signal to the external agent that the hypervisor has crashed; and the external agent configured to generate the crashdump, based on the hypervisor state data.

16. The system of claim 15, wherein the external agent is configured to be aware of physical memory in use by the hypervisor.

17. The system of claim 15, wherein the computing system is configured to prevent the external agent from accessing hypervisor pages while generating the crashdump.

18. The system of claim 15, wherein the external agent avoids writing to a memory page indicated in a map of pages as being devoted to the hypervisor.

19. The system of claim 15, wherein the hypervisor traps on an access to a restricted hypervisor page and fixes up the access by redirecting to a valid memory page.

20. The system of claim 15, wherein the external agent has non-virtualized access to physical memory.

* * * * *